April 27, 1937.  J. I. LINER  2,078,257

SYNCHRONOUS MOTOR

Filed May 28, 1935

Inventor

Joseph I. Liner

By Braselton Whitcomb Davies

Attorneys

Patented Apr. 27, 1937

2,078,257

UNITED STATES PATENT OFFICE 2,078,257

SYNCHRONOUS MOTOR

Joseph I. Liner, Toledo, Ohio, assignor to The Electric Auto-Lite Company, Toledo, Ohio, a corporation of Ohio Application May 28, 1935, Serial No. 23,892

1 Claim. (Cl. 172—279)

My invention relates to electric motors and particularly to alternating current synchronous motors adapted for use with time indicating devices.

The invention comprehends an improved synchronous motor especially for use in clocks which are of the non-self-starting type, but which may be manually launched so that it will automatically get into synchronism with a pulsating current, and thereafter maintain its exact synchronous speed, this being accomplished without the use of any special rotatable means.

An object of the invention is to provide an improved synchronous motor including means coacting with the rotor for manually launching the same at a predetermined speed so that it will automatically get into phase with the frequency of the energizing current and maintain a synchronous speed under wide changes in load conditions as well as ordinary disturbances in the power supply circuits, without inertia devices, or peculiar formations of the polar projections of the structure.

Another object of the invention is to provide a novel manually actuated means so calibrated that the same is operable under all conditions to displace the rotor or move the same at a peripheral speed substantially corresponding to the rapidity of the alternating current changes.

Another object of the invention is to provide a starting member for the rotor so arranged that the possibility of inadvertently stalling the motor is eliminated.

Another object of the invention is the provision of a means coacting with the rotor to position the same with respect to the stator so that operating noises and the tendency of the rotor to hunt are reduced to a minimum and the motor will operate satisfactorily with the shaft in any position.

A further object of the invention is to provide an improved synchronous motor including a novel starting means which insures against the improper starting of the rotor, the structure being exceedingly simple in construction, economically manufactured and highly efficient for carrying out the purposes for which it is designed.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred in which.

For the purpose of facilitating the understanding of my invention, I have illustrated in the accompanying drawing a synchronous motor of a character particularly adapted for driving a clock mechanism, but it is to be understood that I contemplate the use of the invention wherever the same may be found to be applicable.

The invention briefly stated comprehends a synchronous motor comprising a stator and rotor structure, the rotor structure includes a rotatable member provided with a plurality of magnetizable polar projections; the stator structure comprises pole pieces having polar projections in close proximity to the polar projections of the rotor and provided with suitable energizing windings to produce the magneto-motive force which causes the rotation of the rotor. In order to secure the proper initial synchronization of the motor, a manually operable starting member is used, the starting member is so arranged and calibrated to coact with one of the motor structures to cause the movement of the rotor polar projections at a peripheral speed so that the distance from the center of one polar projection to the center of the next is substantially traveled during one half of a cycle of the alternating current to which the energizing windings of the stator are connected, thereby assuring that the rotor will fall into synchronism with the alternating current whenever the starting member is actuated. The invention also includes the use of means to oppose the centralizing action of the magnetic flux on the rotor so that an additional load to the working load is present.

Figure 1:
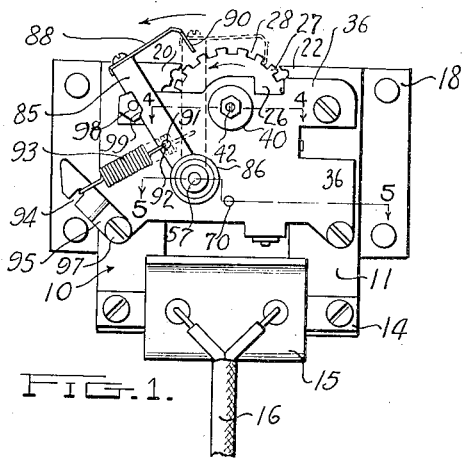
Figure 1 is a rear elevational view of a synchronous motor for blocks embodying the present invention.
Figure 2:
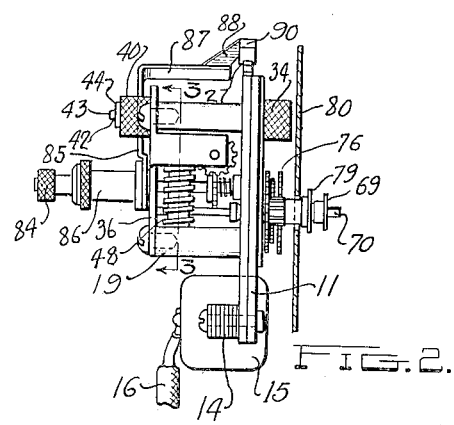
Figure 2 is a side elevational view of the device shown in Figure 1.
Figure 3:
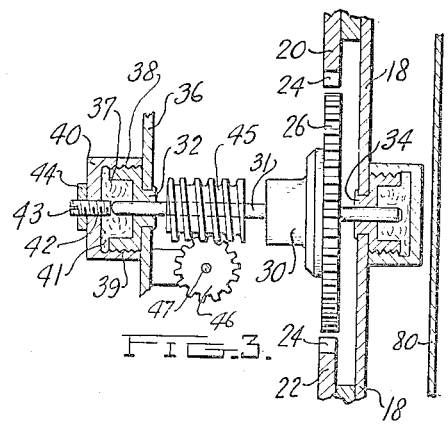
Figure 3 is a sectional view taken substantially in the plane indicated by lines 4—4 of Figure 1, looking in the direction of the arrows.

A practical application of the invention to a motor suitable for clocks is illustrated in Figures 1, 2 and 6 of the drawing in which the synchronous motor is composed of a stator structure and a rotor structure. The stator structure includes a plurality of relatively stationary pole pieces 10 and 11 preferably connected at one of their ends by a laminated frame piece or yoke 14 forming in the embodiment shown a bi-polar magnetic frame. Yoke 14 carries in magnetic relation an energizing coil 15 composed of a plurality of convolutions of conducting material adapted to be connected by suitable leads 16 to an alternating current supply, as for example, with the ordinary commercial regulated sixty cycle alternating current source. This bi-polar structure is mounted upon a plate or frame 18 preferably of non-magnetic material by suitable securing means, such as the end of spacing posts 19. In the embodiment illustrated, the pole pieces 10 and 12 terminate into oppositely disposed extensions 20 and 22 arranged in the form of an arc of a circle and each provided with polar projections 24, several being shown for each pole piece, however, I have found that a single polar projection for each pole serves the purpose very satisfactorily. Adjacent to the polar projections 24 and suitably spaced therefrom is journalled the rotor structure which is adapted to be rotated due to the magnetic field produced by the energization of the coil 15.

The rotor structure includes a magnetizable annular member 26 provided with a plurality of spaced peripheral polar projections 27 of a span substantially corresponding to that of the stator polar projections. The rotor polar projections 27 are spaced by recesses or notches 28, corresponding substantially to the width of the projections 27. The annular member 26 is supported upon a hub 30, fixedly secured to shaft 31, which is suitably supported on bearings or journals 32 and 34 carried respectively by end plates 36 and 18.

Figure 4:
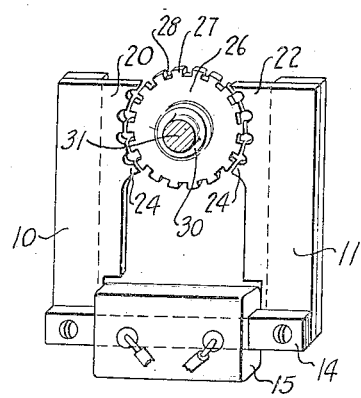
Figure 4 is a diagrammatic view illustrating the relation of the stator and rotor polar projections of the synchronous motor of the invention.
Figure 5:
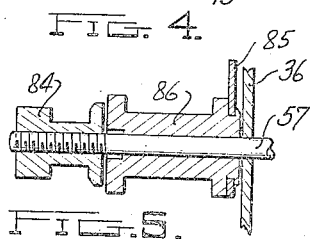
Figure 5 is an enlarged detailed sectional view of the manual control means for starting the motor and the manual time setting arrangement.

Bearing 32, as particularly shown in Figure 4, is provided with an enlarged annular portion 37 having an outer threaded portion 38 adapted to receive a cup-like member 40, having a threaded portion 39 thus providing a closed chamber 41 for the purpose of retaining grease or a suitable lubricating oil. The bearing 34 is similarly constructed to bearing member 32 including substantially the same elements. The end wall of the cup member 40 is provided with a threaded opening for receiving a threaded member 42 mounted in axial alignment with respect to shaft 31 and adapted to contact with one end thereof for the purpose of opposing the centralizing action of the magnetic flux of the stator or rotor structure. Threaded member 42 is capable of adjustment through its threaded connection and by means of slot 43. Member 42 is held or locked in adjusted position by suitable means such as a lock nut 44 coacting with the end face of cup member 40. The purpose of displacing the rotor by the engagement of member 42 with the end of rotor shaft 31 will be hereinafter described.

Fixedly secured to shaft 31 is a worm 45 which serves to drive the clock indicating mechanism by a suitable gear train formed by a plurality of inter-engaging worms and worm-wheels which provides the proper speed ratio for driving the time indicating means. The gear train forms a unitary structure supported upon the back plate 36 including worm-wheel gear 46 fixed to shaft 47, carrying the worm 48 which through suitable interconnecting worms and worm wheels serves to drive the minute hand 69 of the clock indicating mechanism fixed on shaft 70 and through the interconnection of a timing train 76 drives the hour hand 79 coacting with the clock dial 80. For the purpose of the manual setting of the clock without affecting or moving the worm gear train directly connected to the rotor element of the motor, I have provided at one end of the shaft 57 a knurled member 84 which serves to manually rotate the pinion 64 and the rest of the gear train connected to the time indicating means without imparting any rotary motion to worm-wheel 56 due to the frictional connection of said gear to shaft 57.

The synchronous motor hereinbefore described has no starting torque whatever. In fact, it has what is known as stand-still locking torque, for this reason the rotor must be started and brought out to the vicinity of synchronous speed with the polar projections of the rotor in proper position with the polar projections of the stator and also in proper timed relation with the phase of the alternating current, in order that the rotor will fall into step or synchronous speed. In other words, the synchronous operation involves two factors, first, the rotor must be operating at, or approximately at synchronous speed, and second, the rotor and stator polar projections must be in proper relation with each other and in phase with the electro-magnetic flux pulsations. When these two conditions are sufficiently correct, the torque tending to establish synchronism is greater than the inertia and locking torque resisting the rotation of the rotor and therefore the rotor will fall into step. In order to secure proper starting and synchronization of the rotor, I have provided suitable starting means manually operable comprising a pivoted member or pawl arm 85, one end of which is secured to sleeve or thumb piece 86 loosely mounted on shaft 57. Pawl arm 85 has a bent portion 87 upon which is secured flexible resilient pawl member 88 having a depending portion or finger 90 adapted to engage the periphery of annular member 26. Suitably spaced from sleeve 86 I have provided on member 85 an opening 91 adapted to receive the hooked end 92 of a calibrated coil spring 93, the other end of which is anchored as at portion 94 of an adjustable arm 95 suitably secured to frame plate 36 by means of screw 97. Member 85 is retained by the action of spring 93 against stop 98 coacting with a recessed portion 99 of the pivoted member 85.

The starting operation of the motor is obtained after the energizing winding 15 is connected to a regulated alternating current supply by the operator turning the thumb member or sleeve 86 to the right, whereby the pivoted pawl member 85, by means of the depending portion or finger 90 engages the rotor between its teeth, turning the rotor to the right until the side wall of pawl member 85 engages the outer wall of the cup member 40 forming a part of the bearings of the rotor, this position of pawl 85 is illustrated in dotted lines in Figure 1. The turning of sleeve 86 will place under tension the calibrated coil member 93 thereby when the operator releases the thumb member 86 the retractive force of spring member 93 will return pawl member 85 and the portion 90 carrying the rotor in the direction of the arrows, giving a peripheral speed to the rotor, which due to the calibrated retractive force of member 93 is such that a rotor polar projection will move a distance from the center of a polar projection to the center of the next polar projection in a period of time substantially equal to the duration of half of a cycle of the alternating current to which the motor is connected, such peripheral rotation being substantially equal to the synchronous speed of the motor which as is well known is dependent of the number of rotor polar projections. The returning action of the pawl arm 85 will rotate the rotor in the desired direction as indicated by the arrow, thus insuring the proper rotor action and avoiding the possibility of initially starting the rotation of the rotor in the reverse direction, a drawback heretofore present in non-self starting synchronous motors which are manually started. For the purpose of overcoming any inaccuracies in the manufacture of the starting arrangement and for adjusting the tension of spring 93 so that the retractile force exerted upon pawl arm 85 and finger 90 will impart initial rotation to the rotor at substantially synchronous speed, the anchoring arm or post 95 is adjustably mounted. By loosening screw 97 the member 95 may be moved so that the desired tension on spring 93 can be obtained.

It can be seen that due to the different position on the axis of rotation of the rotor with respect to the pivoted axis of the starting pawl 85 the projection 90 only carries the rotor in its movement through a limited arc of a revolution, thereby avoiding any possible interference when the rotor is rotating by the action of the energizing flux.

I have found after considerable study, research and experimentation that by displacing the rotor with respect to the stator thus opposing the centralizing action of the magnetic flux on the rotor caused by the energizing windings carried by the stator if an additional load to the motor working load is present, that the synchronization of the rotor is more readily obtained and that the tendency of the rotor to hunt due to the rapid fluctuation in the power circuit to which the energizing coil is connected is reduced to a minimum. For such purpose I have provided the means hereinbefore described, to-wit: adjustable means in the form of the threaded screw member 42 acting against the rotor shaft 30 and displacing the rotor any desired amount. However, I do not want to limit this means to the arrangement shown.

From the foregoing it will be seen that no separate synchronizing movable weight adapted to impart to the rotor any additional variable inertia movement for synchronizing purposes is used, or that the magnetic polar projections or the rotor or stator are formed in staggered relationship or of peculiar formation which has been heretofore used for such motors. On the contrary, the starting arrangement and the rotor and stator relationship is such as to produce the desired results, that is, easy starting, synchronization and keeping the rotor in perfect synchronism under wide changes in load conditions as well as ordinary disturbances of the power supply, the construction eliminating objectionable noises and the possibility of the rotor stalling when the rotor axis is not maintained in a horizontal plane.

It is apparent that, within the scope of the invention, modifications and different arrangements may be made other than is herein disclosed, and the present disclosure is illustrative merely, the invention comprehending all variations thereof.

What I claim is:

In an alternating current electric clock, a synchronous motor having a stator, a rotor and a setting shaft; means for launching said rotor at substantially synchronous speed comprising a movable member mounted on said shaft and having a portion adapted to engage said rotor; and resilient means coacting with said movable member.

JOSEPH I. LINER.